United States Patent [19]

Greenstein et al.

[11] 4,429,382
[45] Jan. 31, 1984

[54] MICROPROCESSOR MULTIPLEXER METHOD AND APPARATUS FOR BISYNCHRONOUS DATA

[75] Inventors: Larry Greenstein, Miami; Michael B. Marshall, Ft. Lauderdale, both of Fla.

[73] Assignee: Racal Data Communications Inc., Miami, Fla.

[21] Appl. No.: 408,181

[22] Filed: Aug. 16, 1982

[51] Int. Cl.³ .............................................. H04J 3/16
[52] U.S. Cl. ...................................... 370/80; 370/82; 370/103
[58] Field of Search ................... 370/92, 94, 80, 83, 370/61, 91, 96, 41, 95, 79, 103, 82, 111

[56] References Cited

U.S. PATENT DOCUMENTS

| | | | |
|---|---|---|---|
| 3,700,820 | 10/1972 | Blasbalg et al. | 370/82 |
| 4,082,922 | 4/1978 | Chu | 370/94 |
| 4,093,823 | 6/1978 | Chu | 370/92 |
| 4,251,880 | 2/1981 | Baugh et al. | 370/80 |

*Primary Examiner*—Gerald L. Brigance
*Attorney, Agent, or Firm*—Jackson, Jones & Price

[57] ABSTRACT

A microprocessor-controlled method and apparatus for handling transfer of data in bisynchronous protocol between a data source and a data transmission link. The apparatus responds to particular character sequences to request allocation of transmission capacity from a multiplex controller and to terminate character transmission over the data link. The apparatus includes SIO devices for handling character input and output and a microprocessor and associated memory for examining and queuing the received characters. Bidirectional I/O devices communicating with the microprocessor are used in accomplishing monitoring of interface signal changes and in communicating with the multiplex controller.

15 Claims, 14 Drawing Figures

| ADDRESS | DATA | DESCRIPTION |
|---------|------|-------------|
| 8001 | 7 6 5 4 3 2 1 0 | |

- bit 0: SLL0 Channel 0 Local Loop
- bit 1: SELC0 Int/Ext CLK Channel 0
- bit 2: $\overline{SLL1}$ Channel 1 (1=Loop) Local Loop
- bit 3: SELC1 Int/Ext (0=Int) CLK Channel 1
- bit 4: BR0
- bit 5: BR1
- bit 6: BR2
- bit 7: BR3

| 8002 | 7 6 5 4 3 2 1 0 | |

- bit 0: SIOZB

| 8003 | 1 1 0 0 0 0 0 0 | 8255A-5 Control Word |

FIG. 5

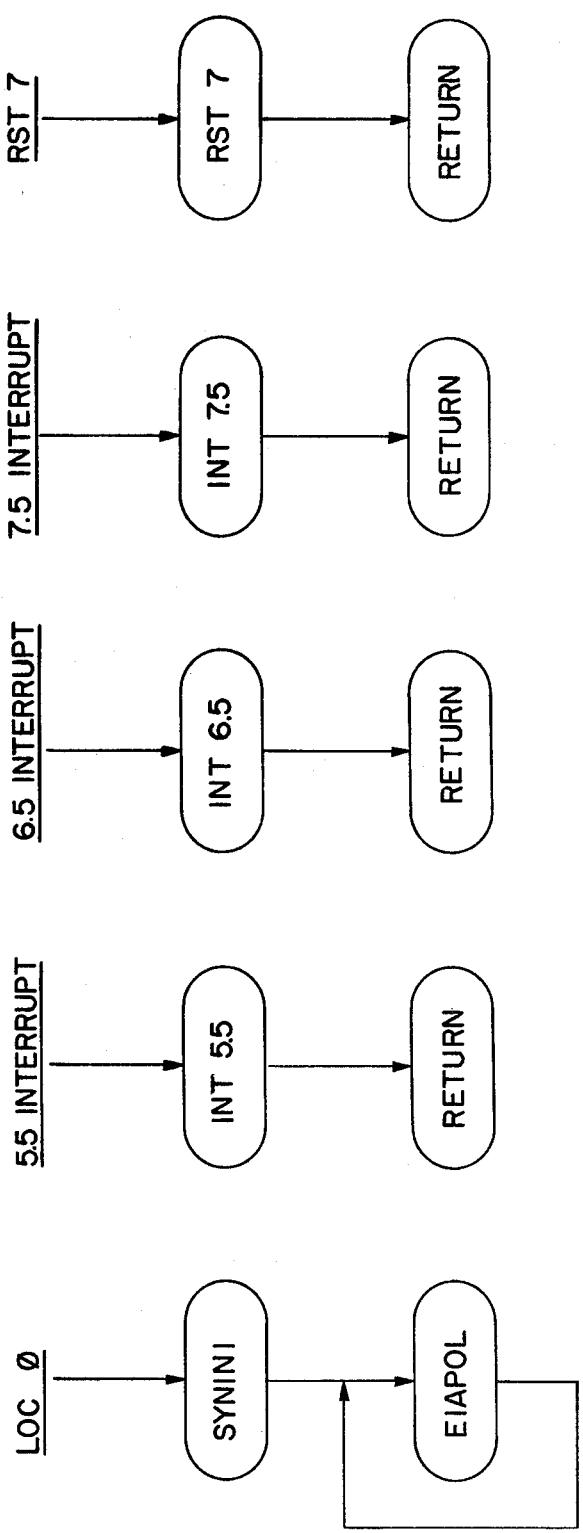
FIG. 6
FIG. 8
FIG. 7

MICROPROCESSOR MULTIPLEXER METHOD AND APPARATUS FOR BISYNCHRONOUS DATA

BACKGROUND OF THE INVENTION

The subject invention relates to multiplexers and more particularly to apparatus for use in statistical multiplexers for multiplexing both synchronous and asynchronous data with high efficiency.

Recently, statistical multiplexers for multiplexing both synchronous and asynchronous data channels have been developed. Such a multiplexer is disclosed in co-pending application Ser. No. 327,495, assigned to the assignee of this application, entitled Statistical Multiplexer with Dynamic Bandwidth Allocation for Synchronous and Asynchronous Channels and incorporated herein by reference. In that multiplexer, a central processor generates control frames for controlling the interleaving of asynchronous data frames and synchronous data channels to achieve high efficiency transmission. The processor monitors requests for transmission capacity for the various competing data sources in order to build appropriate control frames.

While the foregoing apparatus has proven highly effective in practice, a need has been recognized to more particularly adapt such apparatus to handle synchronous data in the so-called "Bisync" protocol. Such a protocol is described, for example, in the IBM Systems Reference Library publication "General Information—Binary Synchronous Communications," October 1970.

SUMMARY OF THE INVENTION

It is therefore a object of the invention to provide apparatus for handling bisynchronous data in statistical multiplexing of such data with other data sources;

It is another object of the invention to provide such apparatus with a capability for occupying 100% of the available transmission capacity with Bisync transmission;

It is yet another object of the invention to provide such an apparatus for handling Bisync data which reacts to actual characters being received, as opposed to channel requests from the data sources;

It is still another object of the invention to detect the need to allocate and deallocate Bisync transmission capacity from examination of the characters received.

It is another object of the invention to accurately synchronize the turn-off of character transmission at both transmitter and receiver.

These and other objects and advantages which will become apparent are accomplished according to the invention by provision of a central processor having means to examine and queue incoming and outgoing data characters. The processor distinguishes between reception of a message and reception of spurious data and "knows" at all times what portion of the message is being handled. In this manner, transmission capacity may be requested and relinquished with maximum accuracy and efficiency. Precise termination of data transmission at local and remote site ensures against loss of information.

In accordance with a further aspect of the invention such central processors are located at both local and remote multiplexer sites and control bidirectional transmission of characters on a data link. The preferred embodiment is particularly adapted to handle data in a Bisynch protocol.

BRIEF DESCRIPTION OF THE DRAWINGS

The preferred embodiment for implementing the just-summarized invention will now be described in detail in conjunction with the drawings of which:

FIG. 5 illustrates additional words transmitted from the associated control apparatus to the apparatus of the preferred embodiment.

FIG. 6 is a flow diagram useful in illustrating overall organization and operation of the preferred embodiment.

FIG. 7 illustrates an I/O storage location containing E1A interface information.

FIG. 8 illustrates a RAM storage location containing EIA interface information.

DETAILED DESCRIPTION OF THE PREFERRED EMBODIMENT

Figure 1:
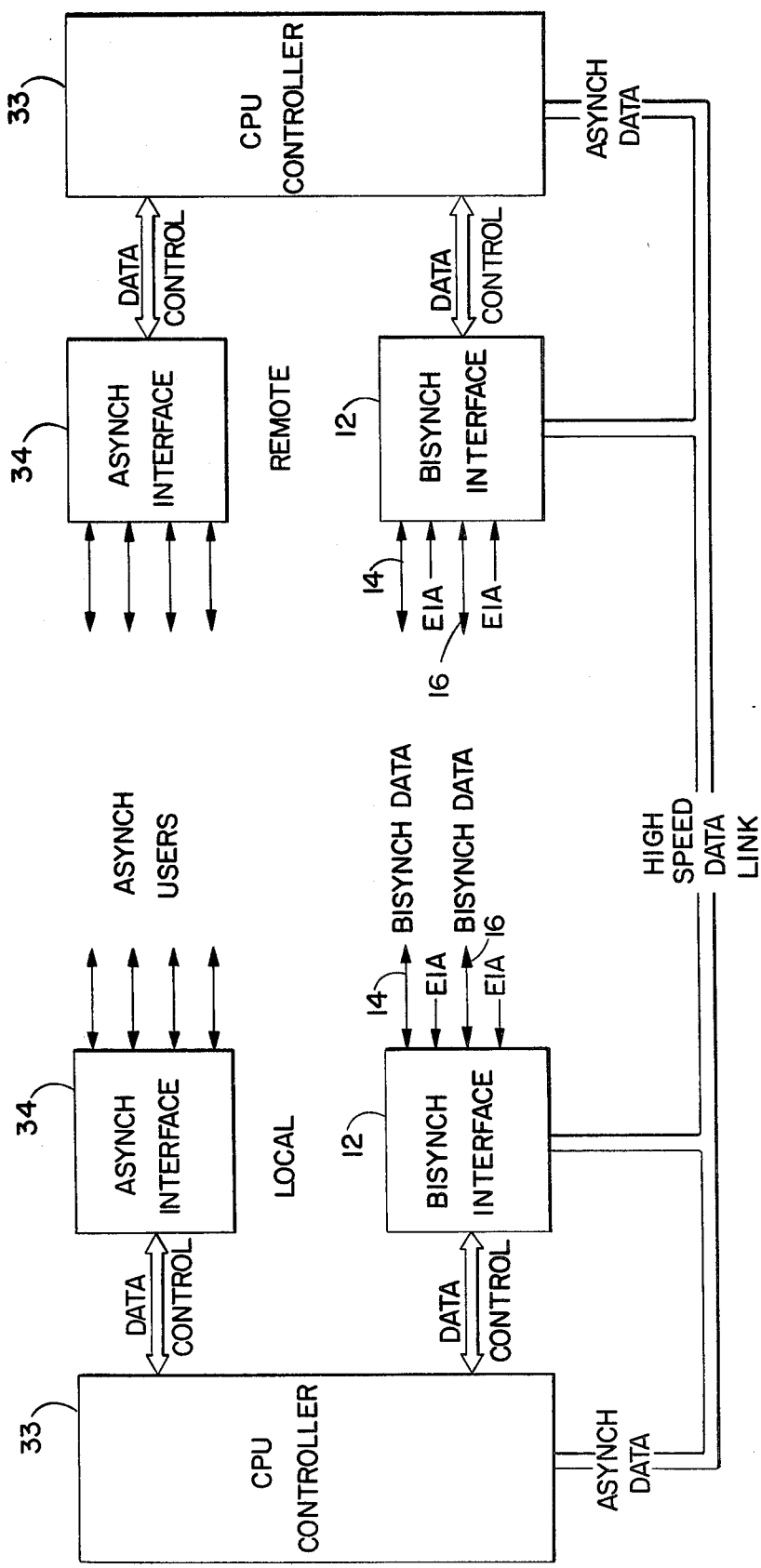
FIG. 1 illustrates the preferred embodiment together with other apparatus with which it finds particular use.

FIG. 1 illustrates the preferred embodiment bisynchronous interface 12 in association with cooperating multiplexer apparatus. This apparatus includes a controller 33 and an asynchronous port handling unit 34. Such apparatus is shown at opposite ends of a data line at sites arbitrarily designated "local" and "remote."

The controller 33 is preferably a microprocessor CPU (central processing unit) having firmware which serves the bisynchronous interface 12 by allocating transmission capacity to various bisynchronous channels 14, 16. The controller 33 manages time slots and keeps track of channel utilization for statistics reporting.

The Bisync interface 12 receives data in Bisync format over the channels 14, 16, from various user sources. The preferred embodiment described herein handles two Bisync channels. A number of modules 12 according to the preferred embodiment may be combined to handle a greater number of Bisync channels such as four or eight.

The Bisync interface 12 also receives and outputs certain EIA interface signals. The signals inputted for each channel include DTR and RTS and those outputted include DSR, RI, CTS and DCD. Other inputs may include a BUSY signal and "LL" signal. The LL input is used when the Bisync interface 12 is connected to a modem through a crossover cable. When the Bisync interface 12 has data to send to the modem, it raises DCD which crosses over to the modem's RTS input. RTS is always software looped to CTS on the local interface. An XOL input is also used to indicate what type of device is connected to the channel. This input is read in through an unused pin of LSIO 23 (FIG. 2).

In an illustrative use, the data sources connected to the channels 14, 16 may transfer data intermittently over the channels 14, 16, at respective rates of up to 9600 BPS. The total data rate for two channels is 2 (9600). The Bisync interface 12 receives, examines and queues this data. The interface 12 informs the controller 33 of the need for allocation of transmission capacity and responds to signals from the controller to output data onto the link. Those in the art sometimes refer to allocation of transmission capacity as allocation of "bandwidth."

Figure 2:
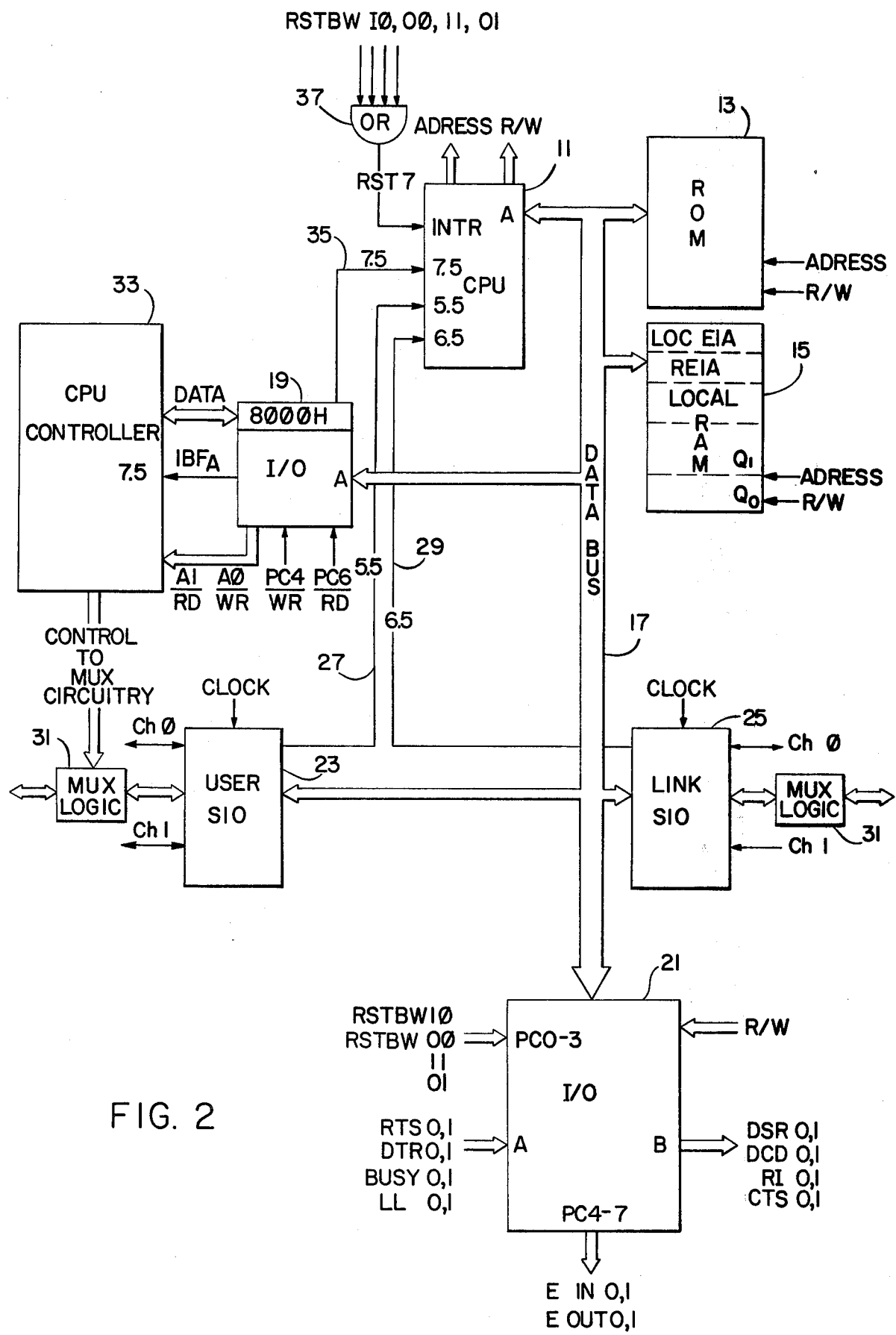
FIG. 2 is a schematic block diagram of apparatus for implementing the preferred embodiment of the invention.

FIG. 2 illustrates in block-diagram form a Bisync hardware module 12. Its general purpose is to control and guide the flow of data and EIA signal changes between Bisync channels 14, 16 and the high speed link.

The Bisync module 12 includes a central processor (CPU) 11, a random access memory (RAM) 15 for storing variables, and a read only memory (ROM) 13 for storing the CPU object code and constants, including a table of characters corresponding to the Bisync protocol of the data to be handled. The CPU 11 may be an Intel 8085A 8-bit microprocessor operating at 6.144 MHz. ROM 13 may be configured of one (1) Intel 2764 chip and RAM 15 of three (3) TMM 2016 chips as manufactured by Toshiba Corp.

The CPU 11 communicates over an 8-bit data bus 17 with the ROM 13 and RAM 15, as well as with other elements of the circuitry. These include first and second general purpose I/O's 19, 21; a user SIO (USIO) 23; and a link SIO (LSIO) 25. The general purpose I/O's 19, 21 are preferably Intel 8255A-5 chips and the USIO 23 and LSIO 25 are preferably respective Zilog Z-80 SIO chips. The SIO chips and other hardware are preferably arranged to handle two separate channels of bisynchronous data denoted channel $\emptyset$ and channel 1. These correspond to the channels 14, 16 of FIG. 1.

The USIO 23 receives data from the user Bisync channels 14, 16 and transfers it under control of the CPU 11 to the RAM 15. The USIO 23 also receives data under control of the CPU 11 from the RAM 15 for transmission to the user. The USIO 23 inputs and outputs user data in serial format and provides an 8-bit parallel input/output path on the data bus 17. Similarly, the LSIO 25 inputs and outputs serial data under control of the CPU 11 to the data link. The LSIO 25 provides an 8-bit input/outout path on data bus 17 for data being transferred on the data bus 17.

As known in the art and described in the Z80 SIO Technical Manual, the USIO 23 and LSIO 25 may operate in a mode where they detect two consecutive sync characters (SYN) and raise an interrupt upon such detection and upon receipt of each Bisync character thereafter. In the preferred embodiment, the USIO 23 and LSIO 25 operate in this mode, raising respective interrupts to the 5.5 and 6.5 interrupt inputs of the CPU 11. These interrupts are provided to the CPU 11 on lines 27, 29 respectively and are used to activate performance by the CPU 11 of service routines for the respective SIO's 23, 25. Since the link SIO 25 timing proves more critical than that of the USIO 23 due to precise turnoff synchronization requirements described hereafter, the link SIO is given the higher priority interrupt. The SIO's 23, 25 are preferably connected to transfer their serial input/output to multiplexing circuitry 31.

The multiplex controller 33 generally functions to monitor data traffic from a plurality of synchronous and asynchronous sources and allocates time slots for transmission of data in a manner calculated to maximize transmission efficiency. One such multiplex controller 33 and associated multiplex logic based on a microprocessor CPU is taught in the abovementioned copending application Ser. No. 327,495.

The first general purpose I/O 21 is an input/output port which is used for inputting and outputting the EIA control signals, as well as some hardware control signals as described hereinafter. It is a slave of the Bisync CPU 11. The second general purpose I/O 19, which is operating in the bidirectional mode, is a slave of the multiplex controller CPU 33 but is utilized by both CPU's 11, 33. The second I/O 19 provides an interface through which the two CPU's 11, 33 communicate.

The I/O 21 is configured in "Mode 0, Control Word 10010001," as explained in the Intel 8255 specifications. Port A receives the inputs from the various interface signal outputs RTS, DTR, BUSY, LL. Inputs PC0 to PC3 receive the reset bandwidth signals RSTBW for each respective channel $\emptyset$,1. Since each channel has both inbound and outbound bandwidth, there are four RSTBW signals with designators I$\emptyset$, I1, O$\emptyset$, O1. Appropriate connections are also made to the read/write control logic of I/O 21 to accomplish addressing of the contents of the I/O 21. For example, the processor 11 may read from the address of Port B or write to the address of port A to accomplish transfers of interface signal information.

The I/O 19 operates in a bidirectional mode, specifically "Mode 2 and Mode 0 (output)" as designated in the Intel 8255 spec (pp. 11–55). The A port of I/O 19 provides input and output to the data bus lines 17. The D (Data) port of I/O 19 provides bidirectional data transfer to the controller 33. Via the A and D ports, bidirectional communication is established between the CPU 11 and the controller 33. The controller 33 is given control of the read/write control logic of the I/O 19. The PC 4 and PC 6 input ports of I/O 19 receive the read/write strobes from CPU 11. Both the controller 33 and CPU 11 may thus read and write asynchronously to and from the I/O 19.

The OBF$_A$ (PC$_7$) pin of the I/O 19 goes up when the controller 33 writes into I/O 19. This pin OBF$_A$ provides the 7.5 interrupt to the CPU 11, initiating the routine which responds to changes in interface signals. When the CPU 11 writes a word into I/O 19 intended for controller 33, the IBF$_A$ lead (PC$_5$) provides an interrupt to the controller to initiate the appropriate action. The B port of I/O 19 provides miscellaneous inputs including two loopback bits, clock selection indication for channels 1 and 2 (i.e., provision for control by a modem clock) and 4 bits for indication of the baud rate.

Figure 3:
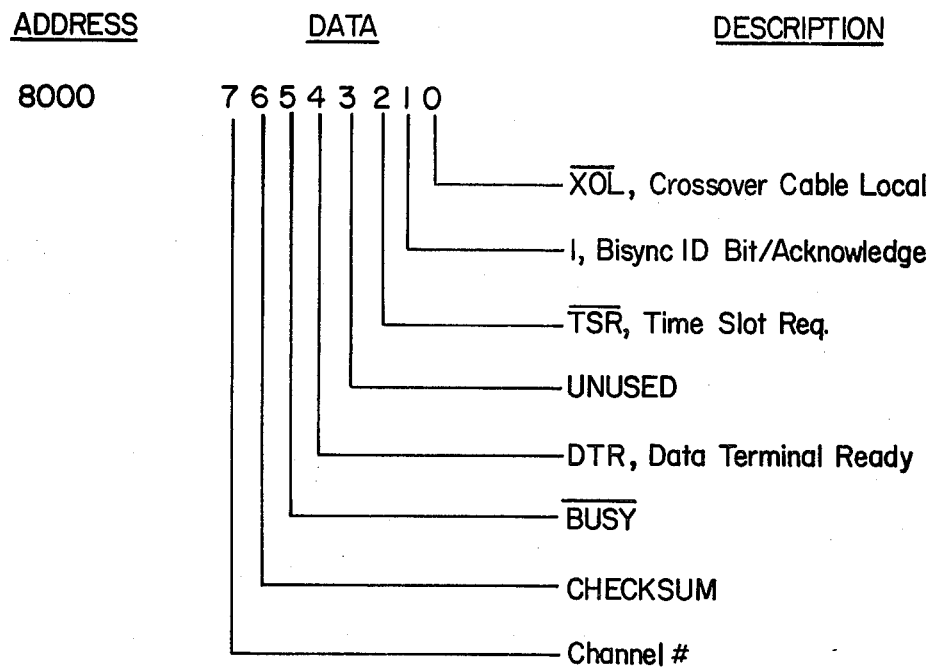
FIG. 3 illustrates a word transmitted from the CPU of the preferred embodiment to an associated control apparatus.

The format of a control word written from the CPU 11 to the controller 33 is shown in FIG. 3. Bit 0 indicates whether there is crossover cable. Bit 1 indicates the command is acknowledge. The Bisync CPU 11 toggles the acknowledge bit whenever it accepts a command from the controller. Bit 3 is the time slot request bit which is activated when the CPU 11 determines transmission capacity is required. Bit 4 is DTR, which indicates the user has toggled the DTR pin. Bit 5 is BUSY which indicates the user has toggled the BUSY pin. The checksum bit, bit 6, indicates bits Ø-5 are the ROM checksum value. Finally, Bit 7 is the channel bit to indicate for which channel, 1 or Ø, the other bits are applicable.

Figure 4:
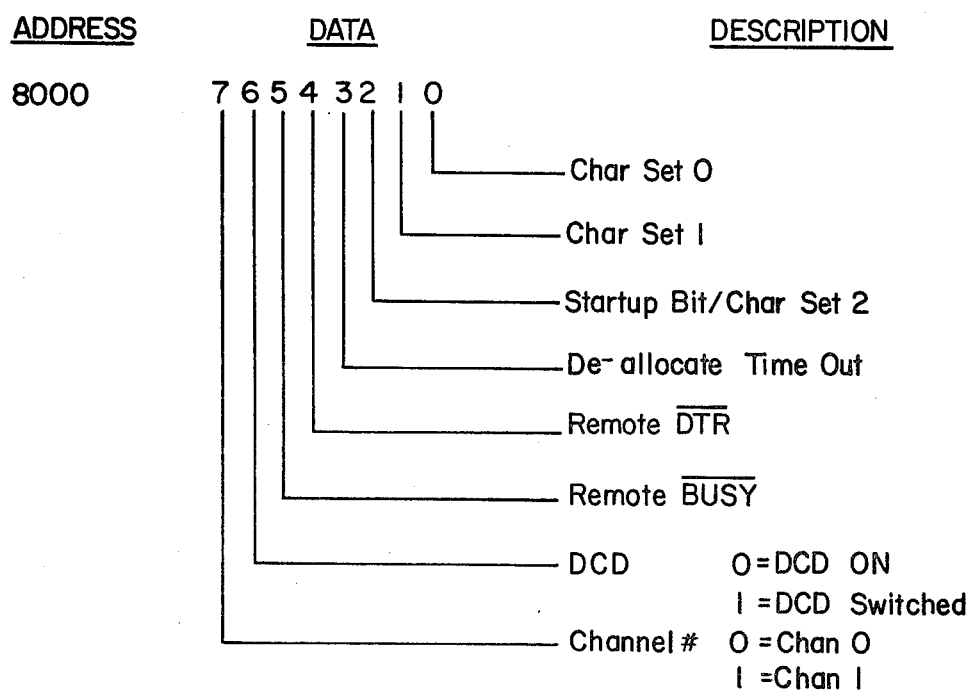
FIG. 4 illustrates a word transmitted from the associated control apparatus to the apparatus of the preferred embodiment.

The format of one control word written from the controller 33 to the I/O 19 for CPU 11 is shown in FIG. 4. Bits 0 and 2 identify to the CPU 11 what particular character set (EBCDIC, TRANS CODE, ASC11 Odd, ASC 11 Even, etc.) is being used. Bit 2 is also the startup bit and, after startup, is read by the CPU 11 as an additional character set bit. Bit 3 instructs the CPU 11 to deallocate its time out. Bits 4 and 5 are an indication of the remote DTR and BUSY status, showing their present state. Bit 6 tells the CPU to raise DCD and leave it on, or raise it at the beginning of a block and drop it at the end. Bit 7 again provides a indication of to which channel the other bits are applicable.

Additional control words written by controller 33 to other locations in I/O 19 are shown in FIG. 5. One of these words is the 8255A-5 Control Word which sets the I/O 19 to the proper mode. The second word contains only one functional bit, SIOZB (serial in/out zero bit rate). This is a hardware reset which is connected directly to the data handling shift registers of both channels. Such connection allows the controller 33 to toggle SIOZB and clear out the shift registers when required. The third word provides baud rate select bist 4-7, clock bits 3 and 1 which select internal or external clock, and local loop bits 2 and 0 which can put a channel in loop back.

Considering the contents of the storage locations provided in the preferred embodiment, the RAM 15 uses 250 bytes for storing the current bandwidth allocation, the local and remote EIA status, the current command to the controller 33 and the current EIA command to the user. The RAM 15 also includes four queues LQØ, LQ1, UQØ, UQ1 for storing data in transmit between the two SIO's 23, 25. Particularly, the RAM 15 includes 2K bytes for Channel Ø UQØ and 7/8K for Channel Ø LQØ. Channel 1 is the same: 2K for UQ1 and 7/8K for LQ2.

The general purpose I/O's 19, 21 include 8-bit storage locations. One location is provided in I/O 19 for read/write to and from the controller 33, and one for the write control word to each I/O 19, 21. One storage location in I/O 21 contains the user EIA status read for both channels, and another storage location in I/O 21 includes the command output to the user EIA for both channels. Other I/O storage locations are used for the SIO command, SIO status and SIO data for each SIO 23, 25 for each channel (a total of twelve locations).

The structure and operation of the apparatus of FIG. 2 for handling data according to the preferred embodiment is now addressed through a discussion of the operation of microprocessor CPU 11 under control of the software stored in the ROM 13. According to the preferred embodiment, the entire software is designed to run on interrupts. The interrupts are utilized as follows:

(1) Trap—A watchdog timer is connected to the CPU 11 Trap input. If the watchdog is not cleared before a selected interval has elapsed (e.g., 600 milliseconds), a trap Interrupt will occur. This causes the CPU 11 to reinitialize the program. Such an arrangement prevents system hangup under certain brownout conditions.

(2) RST 7.5—This interrupt is connected to the second bidirectional I/O 19. It is associated with handling changes in interface signals. Each time the controller 33 writes a word into the register 8ØØØH (FIG. 4) of the second bidirectional I/O 19, the second I/O 19 generates an RST 7.5. The RST 7.5 service routine performed by CPU 11 then takes the word from the read/write storage location which clears the interrupt.

(3) RST 5.5—This interrupt connects to the User SIO 23 and is generated as discussed above. Its occurrence causes the CPU 11 to execute a service routine for Bisync characters in the USIO 23.

(4) RST 6.5—This Interrupt connects to the link SIO 25 and is generated as discussed above. Its occurrence causes the CPU 11 to execute a service routine for Bisync characters in the LSIO 25.

(5) RST 7—This interrupt is connected to the INTR input of the CPU 11 and is associated with a routine RST which is active in shutting down transmission as hereafter described.

FIG. 6 is an overall flow diagram illustrating the manner in which the CPU handles data storage and transfer utilizing the foregoing interrupts. At startup, the Controller 33 allows the object code to run from its initial storage location to initialize operations according to a program denoted SYNINI. The channel initialization SYNINI falls through the background loop of the object code which is denoted EIAPOL.

EIAPOL polls the User EIA signal status and informs the controller 33 of any changes. The EIAPOL routine will be interrupted by any of the 5.5, 6.5 or 7.5 interrupts or by RST 7. The 5.5 Interrupt activates the INT5.5 task and is triggered by the USIO 23. The 6.5 Interrupt activates the INT6.5 task and is triggered by the LSIO 25. The 7.5 Interrupt activates the INT7.5 task and is triggered by the controller 33. Finally, RST 7 activates the RST7 task.

The initialization SYNINI performs the following functions:

(1) Disables interrupts.
(2) Clears local RAM 15.
(3) Checks the Start-Up Bit (D2 of 8ØØØH) and keeps checking this bit until the register in bidirectional I/O 19 is initialized by the controller 33.
(4) Reads character select bits (DØ and D1 of 8ØØØH) to initialize the table of values for control characters (SYN, ETB, ...). This table is stored in ROM 13. In this manner, different Bisync protocols may be accommodated.
(5) Initializes all other tables, pointers, counters, queues.
(6) Initializes the two SIO's 23, 25 to Bisynch mode, Hunt Phase, No CRC's.
(7) Detects Cross-Over Cable presence by checking the DCD bit of the User SIO 23.
(8) Raises CD if constant carrier has been selected.

SYNINI then enables all interrupts and fals through EIAPOL in the Background.

EIAPOL is always in a loop, polling the User's EIA signal changes by reading the EIA status of both channels from the assigned location in the first general purpose I/O 21 denoted 8ØØCH and comparing the obtained value with the previous value saved in a byte denoted LOCEIA of the RAM 15. If a change occurs, EIAPOL will update LOCEIA and inform the Controller 33 of this change by writing an appropriate command to location 8000H in the second bidirectional I/O 19.

The central controller 33 then functions to inform the remote site of the EIA status changes. The writing of the command to 8000H causes IBF$_A$ to interrupt the controller software. The controller software will then read the EIA status from location 8000H, detect the change, and set up a control frame to send out to the remote site, as discussed in application Ser. No. 327,495. The format for 800CH and LOCEIA is shown in FIG. 7.

At the remote site, when the remote controller 33 receives the control frame and detects an EIA signal change from a remote channel, it will cause an interrupt on its associated bisynchronous interface by writing a word into the second bidirectional I/O 19, which activates the INT7.5 task.

INT7.5 then reads the new EIA status supplied by the controller 33 from location 8000H and compares the obtained value with the saved value (in REIA0 for Channel 0 and in REIA1 for Channel 1) to detect the changes, updates the saved value and writes an appropriate command to the assigned location in I/O 21. This command adjusts the remote user EIA interface to match that of the local interface. The format of REIA for channels 0,1 is shown in FIG. 8.

In summary, the 7.5 interrupt handles transmitting the occurences of an EIA change to the remote site. At the remote site, the 7.5 interrupt handles receipt of this information.

Figure 9:
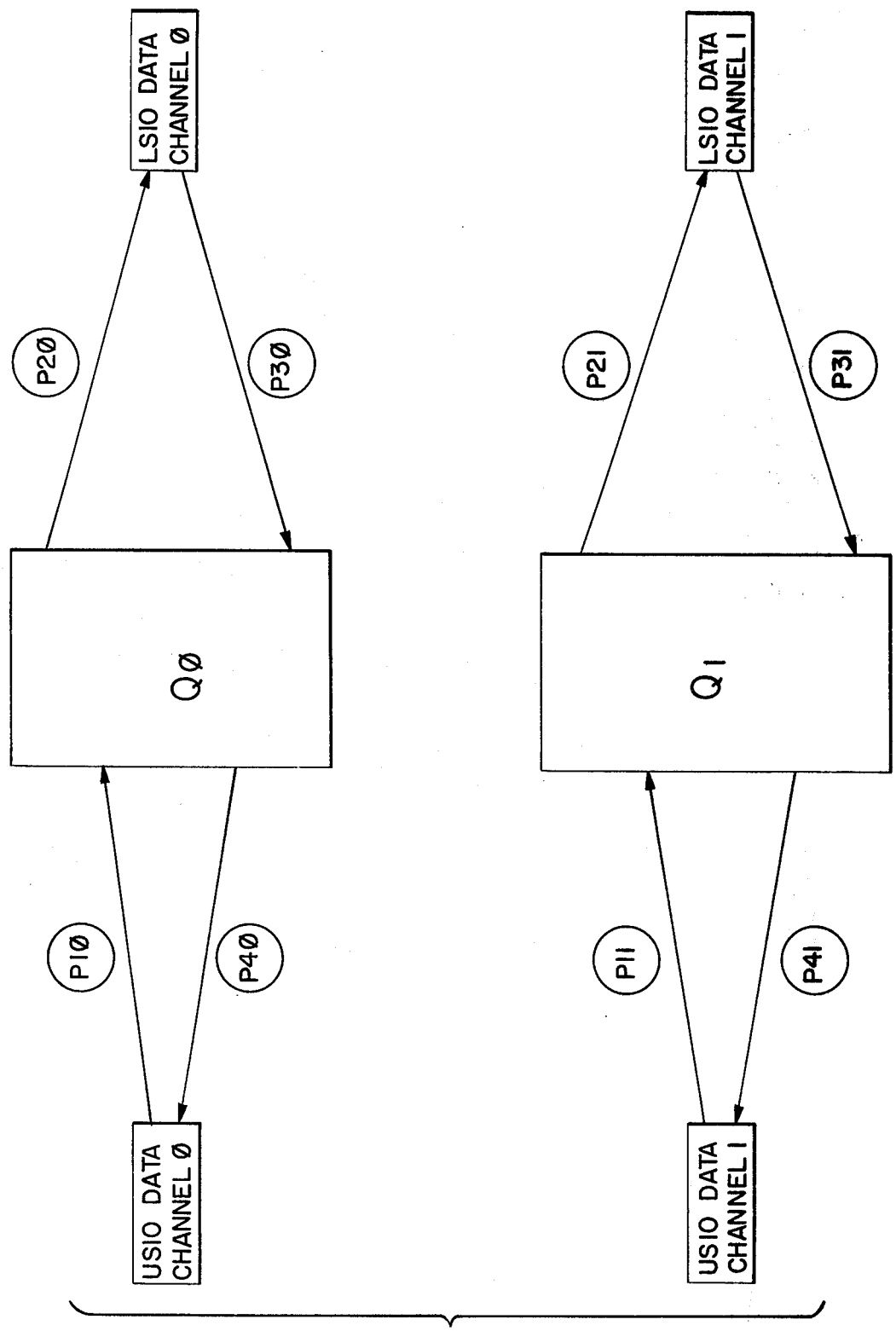
FIG. 9 is a flow chart illustrating the organization of subroutines for handling data between the queues and interfaces of the preferred embodiment.

As before noted, interrupts 5.5 and 6.5 are concerned with transfer of data between the queues in RAM 15 and the SIO's 23, 25. These interrupts activate program sequences wherein a number of subroutines P1, P2, P3 and P4 are selectively called to handle data transfer operations. The use of these subroutines is illustrated in FIG. 9. As shown, P1 handles data transfer from the USIO 23 to a queue, while P4 handles data transfer from a queue to the USIO 23. P2 handles data transfer from a queue to the LSIO 25, and P3 handles data transfer from the LSIO 25 to a queue. Since there are two channels and four queues, there is a respective subroutine P1, P2, for each channel for each queue. The functioning of the apparatus in accordance with these subroutines will now be discussed in detail.

Figure 10:
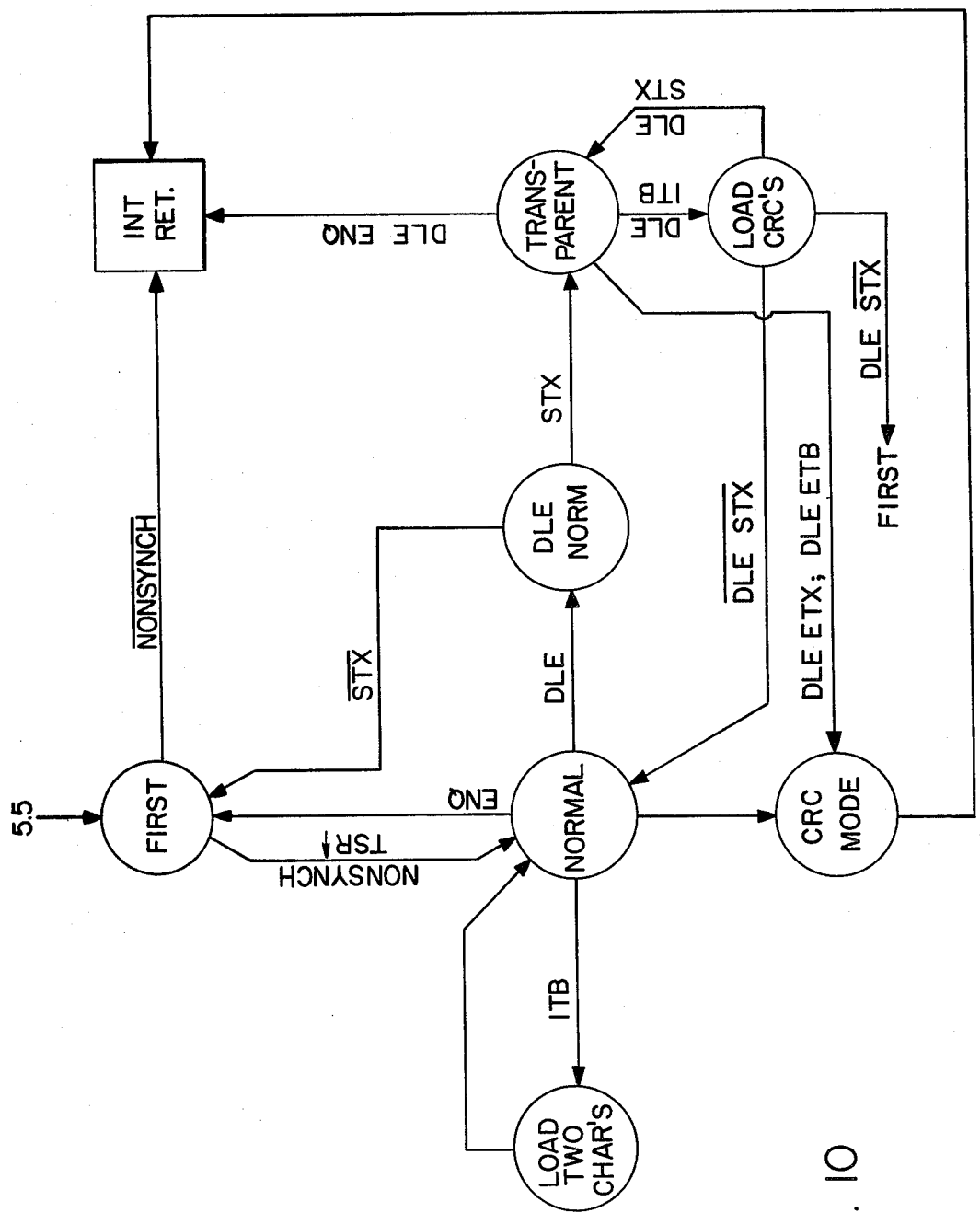
FIG. 10 is a state diagram illustrating the subroutine for transferring characters from the user interface to the queue of the preferred embodiment.

The Bisync software of the preferred embodiment is designed to work with each section of a Bisync message. Thus, the program is in various states depending upon which section of the message is at hand. The sections of the message include the first part of the message (the leading sync (SYN) characters), the text of the message, the ending characters and the CRC characters. The character examination functions of the various subroutines P1, P2, P3, P4 are similar in nature. A discussion of the progress of the P1 subroutine through its various states is now presented in conjunction with FIG. 10.

As noted earlier, after power-up, the first time the USIO 23 detects two synch characters it raises the 5.5 interrupt. Once this occurs, the program P1 enters a state called "FIRST" and looks for a nonsynch character such as STX or SOH. Hardware-wise, the CPU 11 causes the USIO 23 to transfer each character from the USIO 23 to the CPU 11. In the CPU 11, the transferred character is compared to the table of characters stored in the ROM 13. A typical code sequence for transferring and comparing characters is:

| LXI | H,TABLE |
|-----|---------|
| LDA | SIO |
| CMP | M |
| JNZ | NO MACH |

Characters are discarded by the CPU 11 until a nonsynch character is detected. In other words, interrupt return is continuously exercised until a nonsynch character occurs. Thus, in FIRST, each time a character is received by the USIO 23, the 5.5 interrupt occurs and the character is examined to detect whether it is a nonsync character. If it is a sync character the program returns to EIAPOL.

Only one character is considered invalid as a nonsynch character in the FIRST state. That is the FF (all marks) character. FF at this point indicates power was dropped or some other termination of the message occurred. If FF is received while the CPU 11 is in FIRST state the USIO 23 is placed in Sync Hunt mode by the processor 11, searching again for two consecutive SYN's. The software state remains at FIRST.

If a non-FF character is received in the FIRST mode, a switch to the next state (address to be executed) occurs. This state is called the "NORMAL" Mode. Text characters like 1, 2, A, B, C, D will now be received, as many as ten thousand or more. Control characters can be scattered throughout the message. Although the Bisync protocol does not define such a situation, the software of the preferred embodiment is transparent to, i.e., doesn't care about, the occurrence of certain control characters in the text portion of the message. Certain control characters are detected by the CPU 11 and a state change made in response thereto, while others are allowed to pass through the queue whether or not the Bisync protocol is violated. The control characters which cause a state change are stored in the ROM 13 for use by the CPU 11.

In NORMAL, every single character which is received is compared against the TABLE of control characters in ROM 13 and stored into the queue 15. If there is a match, the NORMAL routine will store the character, exit NORMAL and go to the next mode. The characters in the TABLE include:

ENQ (ending character) The next mode is FIRST with the USIO 23 having been reset by the processor 11 to the synch hunt mode to detect two consecutive synch characters ETX (message over, will be followed by two CRC's) The next mode is CRC—

ITB This character is used to break up large blocks of thousands of characters—separate packets are sent—thus, the apparatus will receive two CRC's and go directly back to receipt of the message. An STX may be received prior to the message (ITB, STX). At any rate, a new set of characters will be searched for after ITB. The two characters following an ITB may be CRC's. The two characters following ITB are placed in the queue regardless of what they are.

ETB (treated as ETX)

DLE Another character which is looked for at all times, including the NORMAL mode, is DLE (data link escape). If DLE is received in NORMAL, the state is set to DLE NORM. The state may change again depending on the character following DLE. At this point, the states have progressed through FIRST, NORMAL and DLE NORM. DLE NORM is occupied for only one character time.

If the next character following DLE is an STX, the character is stored and the transparent mode entered. The DLE STX may occur anywhere in the text, although Bisync protocol dictates it to occur after SYN SYN. To end a block in transparent mode, A DLE, ETX, DLE ETB, DLE ITB or DLE ENQ is used. This is done since, as is known, ETX is interpreted as data in transparent mode.

To send transparent text after a DLE ITB, the sequence is DLE ITB CRC CRC DLE STX. If no DLE STX occurs after the second CRC, the mode entered is the nontransparent NORMAL mode.

If, when in the DLE Normal mode, the character after a DLE is not an STX, then the processor treats the DLE as a fault and recovers as if the message had ended, i.e., returns to the FIRST state.

The CRC mode shown is basically a two character delay wherein the two characters received (typically CRC's) are loaded into the appropriate queue. In P1, the next state entered after the CRC mode is the "First" state. Interrupt return is a step in the program, not a state.

The foregoing constitutes the P1 routine, i.e., the routine which loads the queues $UQ_0, UQ_1$. The USIO 23 is always clocked and will cause interrupts after it detects two SYN's. Routine P2 differs in that the LSIO 25 is clocked only when the controller 33 allocates transmission capacity.

P1 also performs some system control functions related to allocation of transmission capacity. When P1 makes the transition from FIRST to NORMAL, P1 requests transmission capacity from the controller 33 by raising the TSR bit in the memory location 8ØØØH of the I/O 19. The controller 33 may allocate transmission capacity immediately or it may not, depending on the extent of utilization of the link. Until capacity is allocated, the Bisync interface CPU 11 stores incoming characters in the queues $UQ_0UQ_1$. In an actual embodiment it has been found that capacity is allocated, typically, four or five character times after TSR is raised.

To allocate capacity, the local controller 33 sends a control frame to a location denoted Agg SIO (an SIO associated with the local controller). The control frame is then sent to the remote controller 33. The occurrence of the control frame being sent out by the controller 33 starts the clocks to the local LSIO 25. Such operation is taught in more detail in the aforementioned application Ser. No. 327,445. Receipt of the control frame similarly starts the clocks to the remote LSIO 25. The local and remote LSIO's 25 then interrupt the respective local and remote programs with a 6.5 interrupt to start P2 running at the local site and P3 at the remote site.

Figure 11:
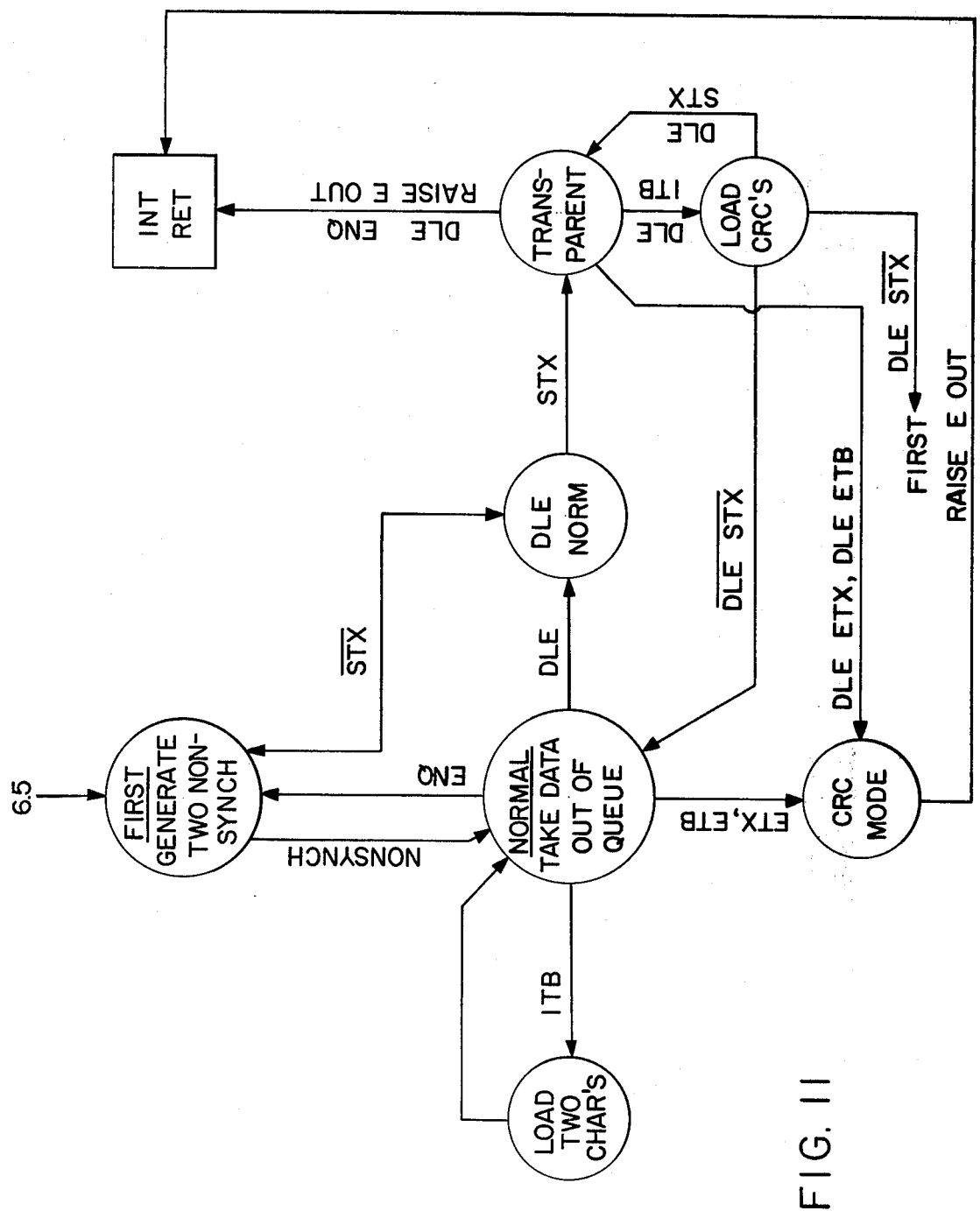
FIG. 11 is a state diagram of a subroutine for transferring characters from the queue to the link interface of the preferred embodiment.

At this point, with the clocks to the local and remote LSIO's 25 running at 1×link, ½×link, ¼×link, or ⅛×link capacity, the transmitter of the LSIO 25 requires a character to transmit. It is in the "P2 FIRST CHARACTER" mode, FIG. 11. In this mode, the LSIO 25 first inserts two SYN characters into the data stream being formed. Then the NORMAL mode is entered and characters are pulled out of the UQ0, UQ1 queue by the CPU 11, sent to the LSIO 25 and transmitted. A similar procedure to P1 is used to effect the data transfers. However, in P2, no FF is looked for because P1 has handled this situation. (If P1 is working, there are never any invalid characters.) If a DLE occurs, the state is DLE NORM, looking for an STX. All the P1 functions are performed because the apparatus must track and "know" when messages start and when they end in order to maximize efficiency of link utilization.

When the end of the message is detected by P2 transmission must terminate. The clock to LSIO 25 is then turned off. The technique is illustrated in connection with the ending character sequence 123 ETX CRC CRC FF FF FF AA used in the preferred embodiment. In essence, the FF characters provide a time interval during which the software has time to act. After the three FF's, an AA (alternating 1's and 0's) is inserted.

Figure 14:
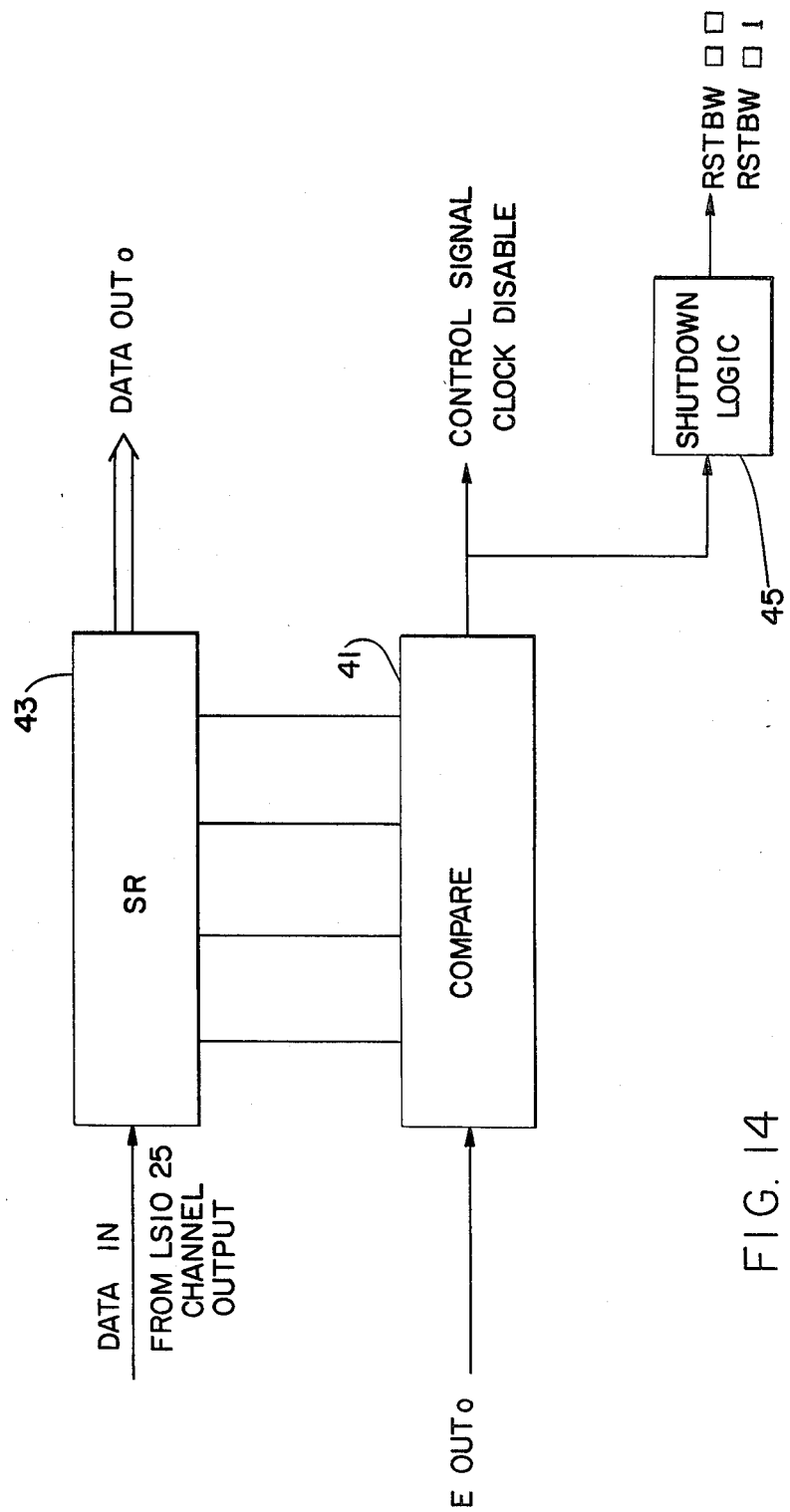
FIG. 14 is a schematic of circuitry cooperative in terminating data transmission in the preferred embodiment.

The "turn-off" mechanism should operate to provide precisely timed turn-off data at both transmitting and receiving ends. To accomplish this, both routines $P_1$ and $P_2$ are continuously checking for ETX or other ending characters. When ETX is detected by CPU 11, the CPU 11 raises bit $E_{out}$ provided on one of the pins PC4 to PC7 of the I/O 21. This bit $E_{out}$ enables a comparator 41 which monitors the bits going through the output shift register 43 of the multiplexer apparatus. These elements 41, 43 are shown in FIG. 14. Circuitry like that of FIG. 14 is provided for each channel.

The comparator 41 is set to detect the AA combination 1010 in the shift register 43. When this combination is detected, the shift register 43 is cleared and transmission is shut down by signal SD disabling the clock to the LSIO 25.

Occurrence of an output from the comparator 41 also produces a change in the appropriate RSTBW bit supplied to the OR gate 37 (FIG. 2) and to the I/O 21. The change at the input of the OR gate 37 triggers the Intr interrupt of the CPU 11 which then executes a reset (RST) routine. In this routine, the CPU reads in the four RSTBW bits RSTBW0 to RSTBW3 from the I/O 21 and determines which channels are shut down and which are active. In so doing, the CPU 11 reads the bandwidth status from memory and compares it to the current RSTBW state supplied to I/O 21 to determine which RSTBW pin changed. The signal $E_{out}$, which was latched, is then dropped by the CPU 11, disabling the RST interrupt. CPU 11 then communicates to the controller 33 through the I/O 19 to inform it of the channel dropping and concomitant new bandwidth status. The IBF$_A$ line is activated to notify the controller 33 so that the controller can make use of the newly available time slots.

If another block remains to be transmitted in the queue, the controller 33 is presented immediately with another request for transmission capacity. The controller 33 must then send another allocation control frame to start transmission of the next block. An important result of the foregoing procedure is that bandwidth turns off synchronized to the bits on the link, i.e., synched to the occurence of AA on the link after the E bit is raised. This is because at the other end of the link, the receiving program, P3, is also tracking the protocol and therefore knows exactly what P2 is doing.

Figure 12:
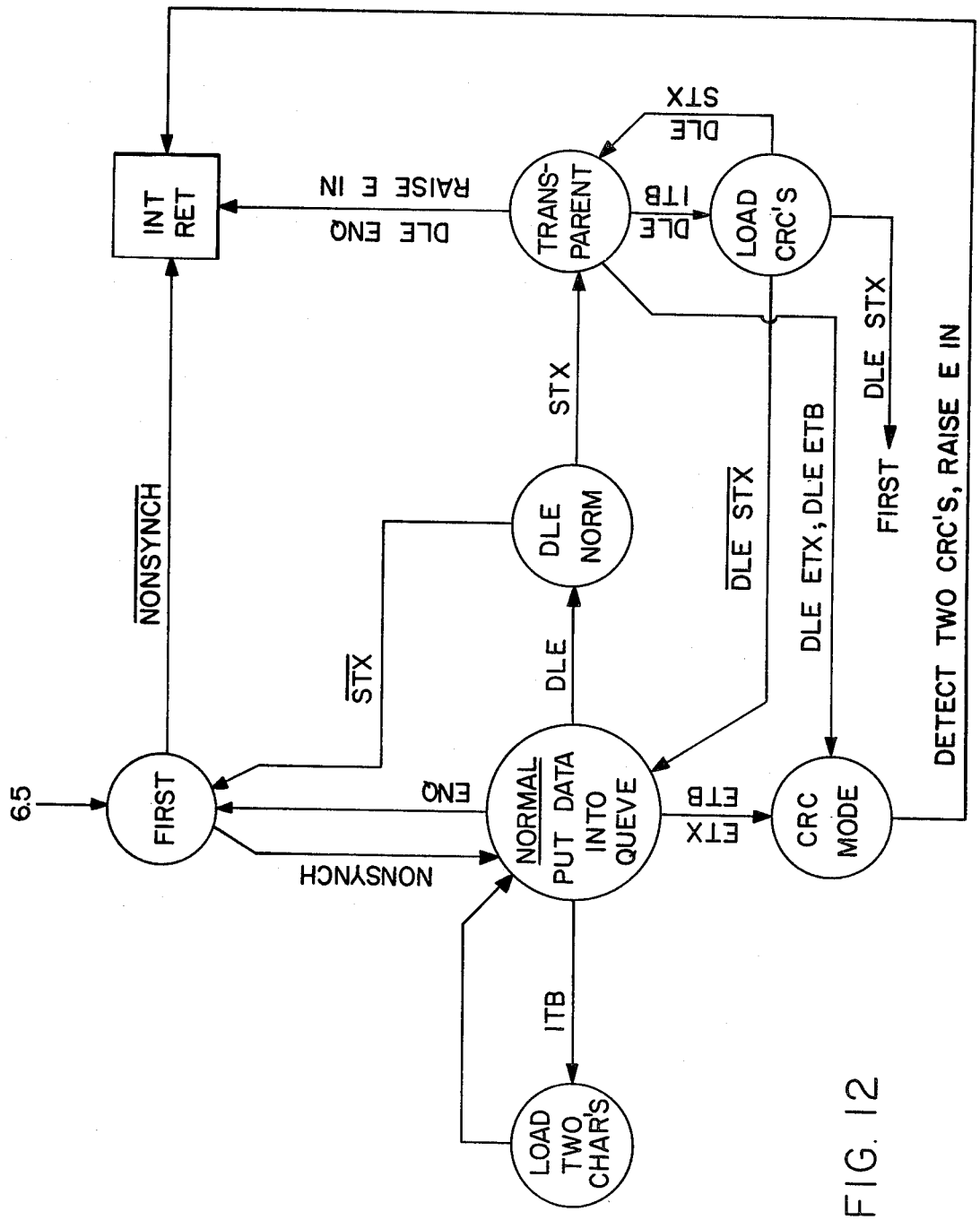
FIG. 12 is a state diagram of a subroutine for transferring characters from the link interface to the queue in the preferred embodiment.

A state diagram for P3 is shown in FIG. 12. P3 has its clock turned on at the same time P2 did at the opposite end of the link. P3 is the same as P1 in receiving data and transferring it into the corresponding queue LQ. The major difference is that P3 must turn off its inbound bandwidth. Thus, P3 has some of the control features of P2 and all of the protocol features of P1.

When P3 see ETX or other ending characters, P3 raises the appropriate $E_{in}$ bit of the I/O 21 at the remote site. It is known that FF's are coming once the second CRC is taken in. The reason three FF's are used is that the LSIO 25 has a three-byte FIFO. The FIFO could have two CRC's and an FF backed up when receipt of the ETX occurs. In this situation, there is an FF on the link and one not sent. The goal is to get the $E_{in}$ bit of I/O 21 up before the AA and after the CRC. The use of these FF's thus prevents alternating 1's and 0's from erroneously turning off the apparatus.

Hardware-wise at the receiver, when the second CRC character is detected by the CPU 11 operating under P3, a comparator is activated by $E_{in}$. Upon detection of 3 FF characters in an input shift register by the comparator, the inbound clock is shut down and the CPU 11 is interrupted by a change in RSTBW (inbound bit) to activate the RST routine. The RST routine then determines the change in bandwidth status, updates the bandwidth status in RAM 15 and drops the appropriate $E_{in}$ bit ($E_{ino}$ for channel ∅), deactivating the interrupt to INT of the CPU 11. The CPU 11 does not inform the controller 33 of the inbound bandwidth change since the controller's job is to allocate outbound transmission capacity only. By controlling outbound bandwidth at both ends, the controller 33 has effective control over transmission on the data link.

Thus, precisely on the fourth bit of the AA character at the transmitting end and receipt of three FF's at the receiver, both the inbound remote and outbound local SIO's 23, 25 are shut down.

Figure 13:
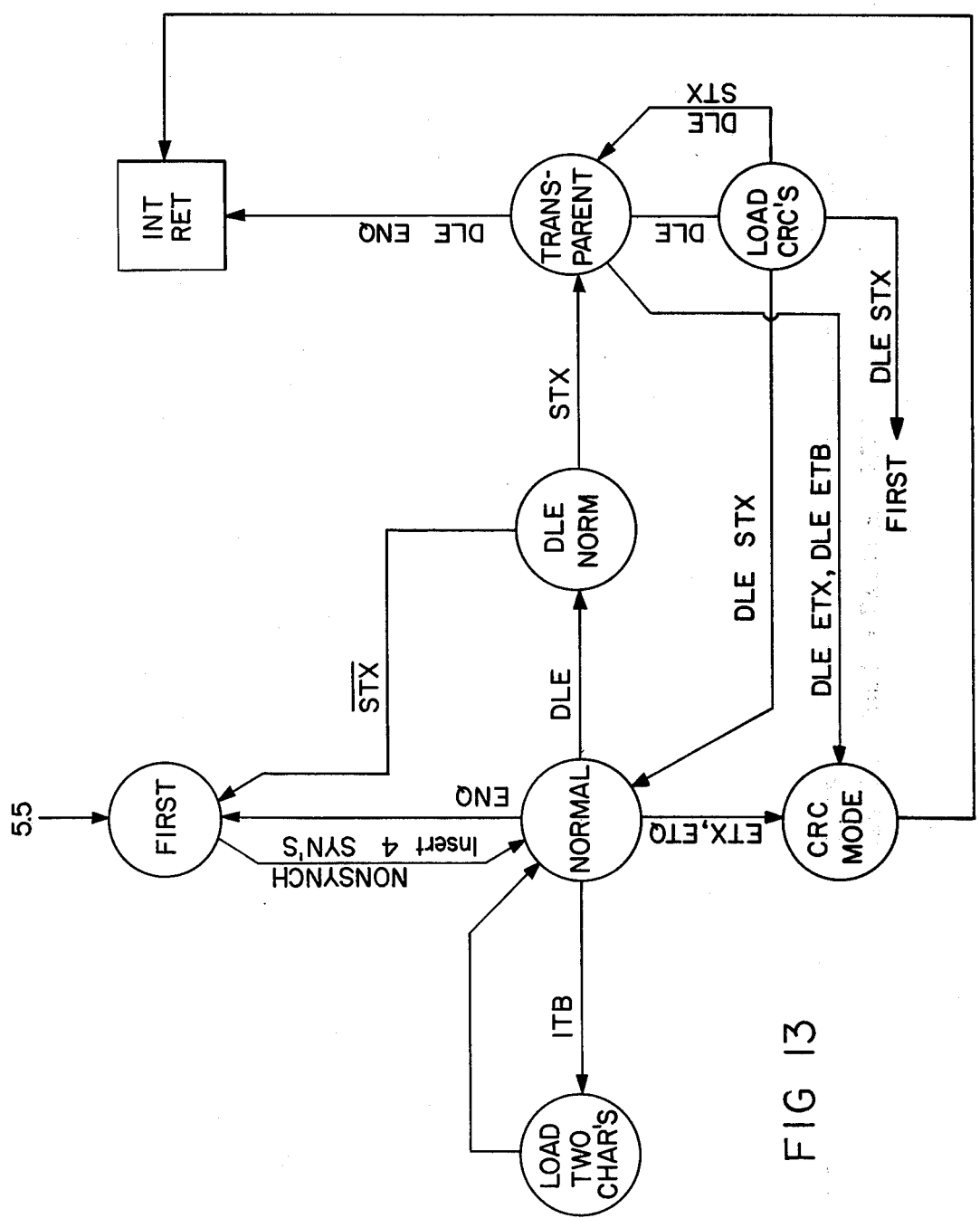
FIG. 13 is a state diagram of a subroutine for transferring characters from the queue to the user interface in the preferred embodiment.

The routine for transferring data to the user interface placed by P3 in the remote queue L∅ is denoted P4. The states of P4 are shown in FIG. 13. P4 is the same as P2 in its transfer functions, but less complicated. As with P2, it functions to transfer data from the queues $LQ_0$, $LQ_1$ to the customer or user. Again, P4 must know where the messages begin and end in order to separate them by SYN characters. However, P4 does not have to wait on bandwidth as do P1 and P2. P4 may have to wait for modem clear-to-send (CTS), which may take 60 or more milliseconds. In the preferred embodiment, the apparatus will wait for CTS for 200 ms and then begin to send regardless of whether CTS has been received. If connected to a terminal, P4 raises DCD and starts transmission. P4 also causes output of four (4) SYN characters to assure customer SYN detect reliability.

In Bisync protocol, the pattern SYN SYN EOT squelches transmission on the line. Also, SYN SYN ENQ may constitute a whole message. When in FIRST mode of any of the above processes P1, P2, P3, P4, an EOT or ENQ follows SYN, SYN, the EOT or ENQ is placed in the queue. The NORMAL state is skipped.

If CPU 11 is in NORMAL and an EOT occurs, it will be missed, and there may never be an end to the message. To deal with such a situation, an 8-second timer may be provided on the controller 33 which will turn off the Bisync CPU 11. This timer can be adjusted if very long blocks of data may be transmitted.

As alluded to earlier, in the preferred embodiment, P1 has two similar versions: P1∅ to handle Channel ∅, P11 to handle Channel 1. P4 has two similar versions: P4∅ to handle Channel ∅, P41 to handle Channel 1. P2 has two similar versions: P2∅ to handle Channel ∅, P21 to handle Channel 1. P3 has two similar versions: P3∅ to handle Channel ∅, P31 to handle Channel 1. The 5.5 and 6.5 interrupt routines determine which sub-routine to activate by examining the respective USIO and LSIO status words stored in the I/O 21.

As known in the art, the USIO and LSIO status words indicate, for example, whether the device has received a character or wants a character to transmit. To illustrate further, when a 5.5 interrupt occurs, the processor looks at the status words, determines which USIO has received a character, takes the character and enters at the appropriate point in P1.

As will be apparent to those skilled in the art, the subject preferred embodiment is subject to numerous adaptations and modifications without departing from the scope of the invention. Therefore, it is to be understood that, within the scope of the appended claims, the invention may be practiced other than as specifically described herein.

What is claimed is:

1. Apparatus for use in multiplexing data onto a data link in conjunction with a controller adapted to provide control words comprising:
   a data bus;
   first means for receiving at least one serial input stream of user data in character format, providing a parallel data path connected to said data bus, and providing a first interrupt signal;
   second means for outputting at least one serial output stream of link data in character format, providing a parallel data path connected to said data bus, and providing a second interrupt signal upon supply of clocks thereto;
   memory means connected to said data bus for storing instructions and data;
   first input/output means connected to said data bus for monitoring and storing user interface signals;
   second input/output means connected to said data bus and to said controller for receiving control words from said controller and from said data bus and for providing a third interrupt signal when said user interface signals change;
   means for providing a fourth interrupt signal when use of the data link is wholly or partly relinquished by said second means; and
   central processor means connected to said data bus for receiving characters and control information and for receiving said first, second, third and fourth interrupts, said processor means being responsive to said first interrupt to examine characters received and request allocation of transmission capacity from the controller after detection of certain selected characters;
   said processor means being responsive to said second interrupt to examine characters and transfer them to said second means;
   said processor means being responsive to said third interrupt to supply updated interface information to said second input/output means for transfer to said controller; and
   said processor means being responsive to said fourth interrupt to supply updated transmission capacity allocation status information to said second input/output means for transfer to said controller after said second means has relinquished transmission capacity on said data link.

2. The apparatus of claim 1 wherein said first input/output means additionally stores a first control signal and wherein said means for producing said fourth interrupt signal comprises logic means responsive to at least said first control signal.

3. The apparatus of claim 2 wherein said central processor means supplies said first control signal to said first input/output means upon detection by said central processor of an ending character.

4. A method of controlling transmission of data characters between remote and local sites including the steps of:
  receiving, at said local site, a plurality of characters to be transmitted;
  raising a request for allocation of transmission capacity at said local site upon detection of receipt of a selected character;
  generating a transmission allocation command at said local site in response to said request;
  transmitting said command between the local and remote sites;
  detecting said command at said remote and local sites and starting local character transmission and remote character reception upon said detection;
  generating a sequence of ending characters at said local site;
  transmitting said sequence of ending characters between the local and remote sites; and
  detecting a first set of said ending characters at said remote site and a second set of said ending characters at said local site and simultaneously terminating data transfer at the local site and data reception at the remote site upon said detection.

5. The method of claim 4 further including the step of supplying an indication to the remote site of a change in transmission allocation capacity resulting from said termination of data transfer.

6. A method for handling transer of data characters between a data link and a source which provides at least one data channel and at least one interface control signal utilizing a central processor, storage means, and input-output means clockable to transfer data in and out of said storage means under control of said processor, said method including the steps of:
  polling the status of said at least one control signal;
  interrupting said processor in the event of a change of status of said at least one control signal to cause said processor to execute a routine for updating the local status of said control signal;
  interrupting said processor in response to detection of character reception by said input/output means to cause said processor to store selected characters and to request allocation of transmission capacity within which to transmit the characters;
  initiating clocking of data out of said input/output means in reply to said allocation request;
  interrupting said processor in response to said clocking of said data out of said input/output means to cause said processor to execute a routine for transferring selected said characters onto the data link;
  disabling clocking of said data output means in response to detection of a predetermined ending character sequence;
  and interrupting said processor in response to said disabling to cause said processor to execute a routine for updating the status of available transmission capacity.

7. Data multiplexer apparatus for statistically multiplexing synchronous and asynchronous data onto a data link comprising:
  means including a first central processor means and supplied with a plurality of asynchronous data channels for controlling application of said asynchronous data onto said link;
  means including a second central processor means and supplied with a plurality of synchronous data channels;
  said first and second processor means interacting such that asynchronous and synchronous data are statistically multiplexed together when the synchronous channels do not require full transmission capacity of the data link and such that statistically multiplexed synchronous data for one or more of said synchronous data channels occupies 100% of the transmission capacity of said data link when required.

8. The apparatus of claim 7 wherein, upon detection of synchronous data, said second processor means requests transmission capacity allocation from said first processor means, and wherein synchronous data transmission begins immediately upon allocation of transmission capacity by said first processor means.

9. The apparatus of claim 7 or 8 wherein the synchronous channels transmit at fractions of the transmission capacity of said link and wherein a number of said synchronous channels having transmission rates totalling the link capacity may be statistically multiplexed and transmitted with substantially no delay.

10. The apparatus of claim 7 or 8 further including means for receiving transmitted data at the opposite end of said data link; and means at respective ends of the data link for terminating data transmission and data reception in response to a shut-down code; and wherein said second processor means is operative to detect a character indicating end of a message under transmission and to cause simultaneous cessation of transmission and reception at both ends of the data link by effecting transmission of said shut-down code.

11. The apparatus of claim 7 further including:
  data output means responsive to a clock signal to transmit said synchronous data onto the data link;
  storage means for storing a control signal;
  means activated by said control signal for detecting a match between data under transmission by said data output means and a selected bit pattern;
  logic means responsive to detection of a match by said detecting means to produce a clock shut-down signal for stopping supply of said clock signal to said data output means;
  and wherein said central processor means further functions to detect an end-of-message character and, in response to said detection, supplies said control signal to said storage means, thereby activating said detection means, and, further in response to said detection, causes said selected bit pattern to be supplied to said data output means.

12. A method of statistical multiplexing utilizing first and second central processors wherein synchronous data channels may occupy the total transmission capacity of a data link, the method comprising the steps of:
  allocating transmission capacity to synchronous and asynchronous channels using the first central processor;
  tracking synchronous data messages using the second central processor;
  requesting transmission capacity from said first central processor for each synchronous message upon detection thereof by said second central processor;

allocating transmission capacity up to the full link capacity to said synchronous messages when requested;

terminating message transmission on a particular synchronous channel by transmission by said second processor of a shut-down code over that channel; and reporting the shut-down of said channel to said first central processor such that the shut-down transmission capacity may be reallocated.

13. Apparatus for multiplexing bisynchronous and asynchronous data on a data link comprising:

a storage means;

first I/O means clockable for receiving and outputting at least first and second bisynchronous data channels between said storage means and a user interface;

second I/O means clockable for receiving and outputting at least first and second bisynchronous channels between said storage means and the data link;

means responsive to a control signal for detecting a selected code in the output of said second I/O means;

first processor means for allocating transmission capacity to said bisynchronous and asynchronous channels and for allocating up to the entire transmission capacity to said bisynchronous channels, said first processor being adapted to allocate transmission capacity to said bisynchronous channels by starting clocking of said second I/O means;

second processor means for receiving bisynchronous data from said first I/O means, comparing each character received to a table of stored characters, transferring selected bisynchronous characters through said storage means to said second I/O means, said second processor including first and second subroutines operative on characters received from both bisynchronous channels;

wherein the first subroutine recognizes synch characters, thereafter searches for a valid non-synch character, raises a request for allocation of transmission capacity to said first processor means upon detection of a valid non-synch character and transmits received characters to the storage means;

wherein the second subroutine activates upon starting of clocking to said second I/O means by said first processor means, and, upon activation, transfers data from said storage means to said second I/O means, and generates said control signal upon detection of an end of message character; and wherein said second processor means causes said code to be supplied to said second I/O means after raising of said control signal.

14. The apparatus of claim 13 further including means for receiving data from the data link and wherein said second processor means further includes a third subroutine for controlling receipt of data from the link and storing it in the storage means and, a fourth subroutine for taking characters out of the storage means and outputting them to the link, and wherein said apparatus further includes means responsive to said code to shut-down and receiving means.

15. The apparatus of claim 14 further including means for transmitting a code to said first processor means after shut-down indicating the availability of transmission capacity.

* * * * *

UNITED STATES PATENT AND TRADEMARK OFFICE
CERTIFICATE OF CORRECTION

PATENT NO. : 4,429,382

DATED : January 31, 1984

INVENTOR(S) : Larry Greenstein, Michael B. Marshall

It is certified that error appears in the above—identified patent and that said Letters Patent is hereby corrected as shown below:

Column 1, line 23, delete "for" and substitute --from-- therefor.

Column 1, line 35, delete "a" and substitute --an-- therefor.

Column 3, line 59, delete "outout" and substitute --output-- therefor.

Column 5, line 33, delete "bist" and substitute --bits-- therefor.

Column 5, lines 43-44, delete "transmit" and substitute --transit-- therefor.

Column 6, line 61, delete "fals" and substitute --falls-- therefor.

Column 9, line 10, insert --.-- after SYN.

Column 9, line 10, delete "A" and substitute --a-- therefor.

Column 9, line 10, delete comma "," after DLE.

UNITED STATES PATENT AND TRADEMARK OFFICE
CERTIFICATE OF CORRECTION

PATENT NO. : 4,429,382

DATED : January 31, 1984

INVENTOR(S) : Larry Greenstein, Michael B. Marshall

It is certified that error appears in the above—identified patent and that said Letters Patent is hereby corrected as shown below:

Column 10, line 16, insert --of-- before data.

Column 13, line 34, delete "transer" and substitute --transfer-- therefor.

Column 16, line 29, delete "and" and substitute --said-- therefor.

Signed and Sealed this

First Day of January 1985

[SEAL]

Attest:

GERALD J. MOSSINGHOFF

Attesting Officer

Commissioner of Patents and Trademarks